(12) United States Patent
Filho et al.

(10) Patent No.: US 12,515,610 B1
(45) Date of Patent: Jan. 6, 2026

(54) OCCUPANT RESTRAINT SYSTEM AND METHOD OF DEPLOYING SAME

(71) Applicant: GM Global Technology Operations LLC, Detroit, MI (US)

(72) Inventors: Gilberto Tadeu De Oliveira Filho, Arcadia, CA (US); William Cavalcante Araujo, La Verne, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/820,748

(22) Filed: Aug. 30, 2024

(51) Int. Cl.
| | | |
|---|---|---|
| *B60R 21/231* | (2011.01) | |
| *B60R 21/0136* | (2006.01) | |
| *B60R 21/015* | (2006.01) | |
| *B60R 22/46* | (2006.01) | |
| *B62D 25/06* | (2006.01) | |

(52) U.S. Cl.
CPC ........ *B60R 21/231* (2013.01); *B60R 21/0136* (2013.01); *B60R 21/01512* (2014.10); *B60R 22/46* (2013.01); *B62D 25/06* (2013.01); *B60R 2021/23107* (2013.01); *B60R 2022/4666* (2013.01)

(58) Field of Classification Search
CPC ........................................... B60R 2021/23107
See application file for complete search history.

(56) References Cited

U.S. PATENT DOCUMENTS

| | | | | |
|---|---|---|---|---|
| 2,834,606 | A  * | 5/1958 | Bertrand | B60R 21/20 |
| | | | | D12/400 |
| 9,487,177 | B2 * | 11/2016 | Schneider | B60R 21/206 |
| 11,618,408 | B2 * | 4/2023 | Freisler | B60R 21/232 |
| | | | | 280/729 |
| 12,208,765 | B1 * | 1/2025 | Jaradi | B60R 21/23138 |
| 2019/0135220 | A1 * | 5/2019 | Rupp | B60R 21/2155 |
| 2020/0238942 | A1 * | 7/2020 | Ito | B60R 21/205 |
| 2022/0032870 | A1 * | 2/2022 | Card | B60R 21/205 |
| 2022/0063537 | A1 * | 3/2022 | Lee | B60R 21/015 |
| 2024/0116472 | A1 * | 4/2024 | Lee | B60R 21/23138 |

FOREIGN PATENT DOCUMENTS

| | | | | | |
|---|---|---|---|---|---|
| CN | 112585040 | A  * | 3/2021 | .......... | B60R 21/205 |
| CN | 117841895 | A  * | 4/2024 | | |
| CN | 118182380 | A  * | 6/2024 | .......... | B60R 21/205 |
| DE | 102007051281 | A1 * | 4/2009 | .......... | B60R 21/231 |
| DE | 102017006274 | B3 | 12/2018 | | |
| DE | 102017121798 | A1 * | 3/2019 | | |
| DE | 102018117714 | A1 | 1/2020 | | |
| DE | 102019118842 | A1 * | 1/2021 | .............. | B60N 2/01 |
| DE | 102021207147 | A1 | 2/2022 | | |

(Continued)

*Primary Examiner* — Nicole T Verley
(74) *Attorney, Agent, or Firm* — Honigman LLP; Matthew H. Szalach; Jonathan P. O'Brien (57) ABSTRACT

An occupant restraint system of a vehicle having an interior with a front end and a rear end spaced from the front end with respect to a longitudinal axis, the occupant restraint system comprising a first airbag having a first inlet, a first reactionary surface facing the front end, and a support surface facing the rear end and spaced from the reactionary surface, and a second airbag having a second inlet, a second reactionary surface engaged with the support surface, and an occupant surface facing the rear end.

17 Claims, 11 Drawing Sheets

(56) References Cited

FOREIGN PATENT DOCUMENTS

| DE | 102021211553 A1 | * | 8/2022 | |
|---|---|---|---|---|
| DE | 102023108675 A1 | | 1/2024 | |
| DE | 102023133457 A1 | * | 6/2024 | ........... B60R 21/207 |
| DE | 102024106785 A1 | * | 9/2024 | ........... B60R 21/213 |
| EP | 3640095 A1 | * | 4/2020 | ....... B60R 21/01512 |
| EP | 4074557 A1 | * | 10/2022 | ........... B60R 21/206 |
| JP | 2021017163 A | * | 2/2021 | |
| JP | 2021037922 A | * | 3/2021 | |
| JP | 6930504 B2 | * | 9/2021 | |
| JP | 7451113 B2 | * | 3/2024 | |
| WO | WO-2021165392 A1 | * | 8/2021 | ........... B60R 21/231 |
| WO | WO-2024137190 A1 | | 6/2024 | |

* cited by examiner

OCCUPANT RESTRAINT SYSTEM AND METHOD OF DEPLOYING SAME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicles and, more particularly, to an occupant restraint system.

In general, vehicles can be equipped with safety systems such as airbags. However, existing systems commonly rely on a portion of an interior of the vehicle as a reaction surface during operation of the airbags. Some interior arrangements of vehicles do not provide a reaction surface, or the reaction surface is located far from where one or more occupants are seated and, thus, ordinary airbag systems may not operate optimally. One or more shortcomings of existing systems will be addressed by one or more aspects of the present disclosure.

SUMMARY

In one configuration, a vehicle is provided and includes a vehicle body including an interior and an exterior opposite the interior. The interior having a front end and a rear end spaced from the front end with respect to a longitudinal axis, a first side and a second side spaced from the first side with respect to a lateral axis, and at least one seat for an occupant arranged at the rear end of the interior. The vehicle further including an occupant restraint system arranged in the interior. The occupant restraint system including a first airbag having a first inlet, a first reactionary surface facing the front end, and a support surface facing the rear end and spaced from the reactionary surface and a second airbag having a second inlet, a second reactionary surface engaged with the support surface, and an occupant surface facing the rear end.

The vehicle may include one or more of the following optional aspects. For example, the first airbag is arranged between the front end and the second airbag with respect to the longitudinal axis. The second airbag can be arranged between the first airbag and the rear end with respect to the longitudinal axis. The first airbag and the second airbag can both be arranged fore-aft with respect to the at least one seat.

According to at least one aspect, the vehicle body further includes roof rails that extend between the front end and the rear end of the interior, a central spine that extends between the front end and the rear end of the interior, and a roof coupled to the roof rails and the central spine. The vehicle body can further include one or more doors that each include a door panel, a front panel arranged at the front end of the interior and spaced from the at least one seat with respect to the longitudinal axis, and a console arranged in the interior and extending between the front end and the rear end with respect to the longitudinal axis. The first airbag can be arranged in and is configured to deploy from one of the front panel, the central spine, one of the roof rails, or one of the door panels. The second airbag can be arranged in and is configured to deploy from one of the central spine, one of the roof rails, the center console, or one of the door panels.

According to another aspect, the occupant surface faces the at least one seat. The second airbag can include a bottom surface that extends between the second reactionary surface and the occupant surface.

In another configuration, an occupant restraint system of a vehicle having an interior with a front end and a rear end spaced from the front end with respect to a longitudinal axis is provided. The occupant restraint system includes a first airbag having a first inlet, a first reactionary surface facing the front end, and a support surface facing the rear end and spaced from the reactionary surface and a second airbag having a second inlet, a second reactionary surface engaged with the support surface, and an occupant surface facing the rear end.

The vehicle may include one or more of the following optional aspects. For example, the first airbag is arranged between the front end and the second airbag with respect to the longitudinal axis. The second airbag can be arranged between the first airbag and the rear end with respect to the longitudinal axis.

According to at least one aspect, the second airbag further includes a bottom surface that extends between the second reactionary surface and the occupant surface.

According to another aspect, the first airbag and the second airbag extend more than half of the length between the front end and the rear end of the interior.

According to at least one example, the first inlet is arranged between the first reactionary surface and the support surface with respect to the longitudinal axis. The second inlet can be arranged between the second reactionary surface and the occupant surface with respect to the longitudinal axis.

In another configuration, a method of deploying an occupant restraint system is provided and includes monitoring a control system to detect a collision, determining whether airbag deployment is required, determining whether an occupant is positioned properly in a seat, deploying a first airbag comprising a first reactionary surface and a support surface spaced from the first reactionary surface with respect to a longitudinal axis, and deploying a second airbag after the first airbag, the second airbag comprising a second reactionary surface that contacts the support surface and an occupant surface spaced from the second reactionary surface with respect to the longitudinal axis.

The method may include one or more of the following optional aspects or steps. For example, deploying the second airbag occurs after deploying the first airbag.

According to one aspect, the method further includes comprising initiating a service request.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Autonomous vehicles (i.e., partially autonomous or fully autonomous) can have occupant arrangements that are not commonly found in traditional vehicles. In some of these occupant arrangements, the occupants are arranged at a greater distance (e.g., more than 1500 mm) away from an instrument panel. Airbags typically rely on some structure of the vehicle so the airbag and an inflator can be stored and so that the airbag has a reaction surface to interact with when the airbag is deployed. Thus, existing systems will not suffice when an occupant is positioned far from an instrument panel or another reactionary surface.

Figure 1:
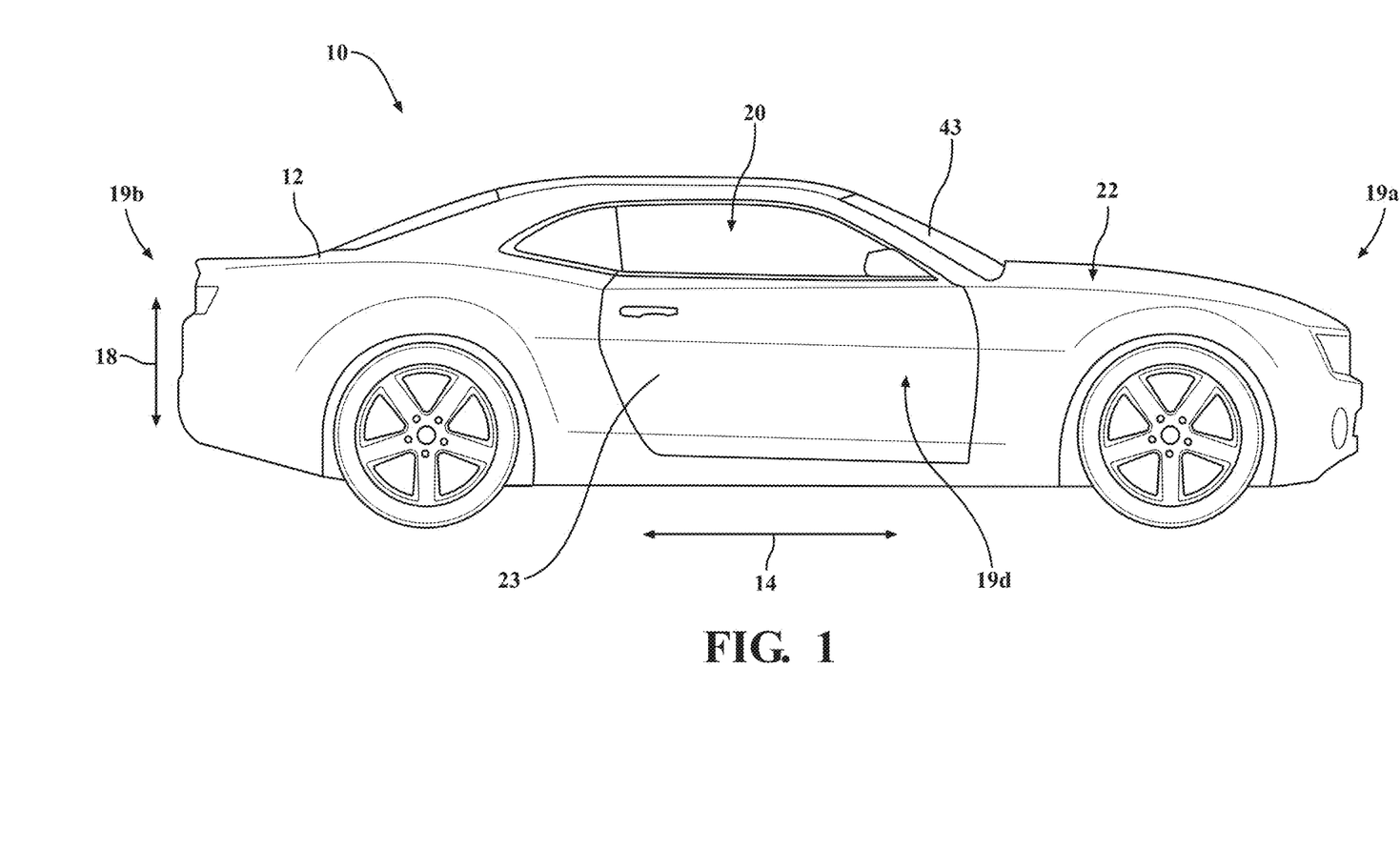
FIG. 1 is a side view of a vehicle according to principles of the present disclosure.

With reference to FIG. 1, a vehicle 10 is provided and includes a vehicle body 12 extending along a first or longitudinal axis 14 in a fore-aft direction, along a second or lateral axis 16 (FIG. 3) in a cross-car direction, and along a third axis 18 in a vertical direction. The vehicle body 12 includes a first or front end 19a, a second or rear end 19b spaced from the front end 19a with respect to the longitudinal axis 14, a first or left side 19c (FIG. 3), and a second or right side 19d spaced from the left side 19c with respect to the lateral axis 16.

Figure 2:
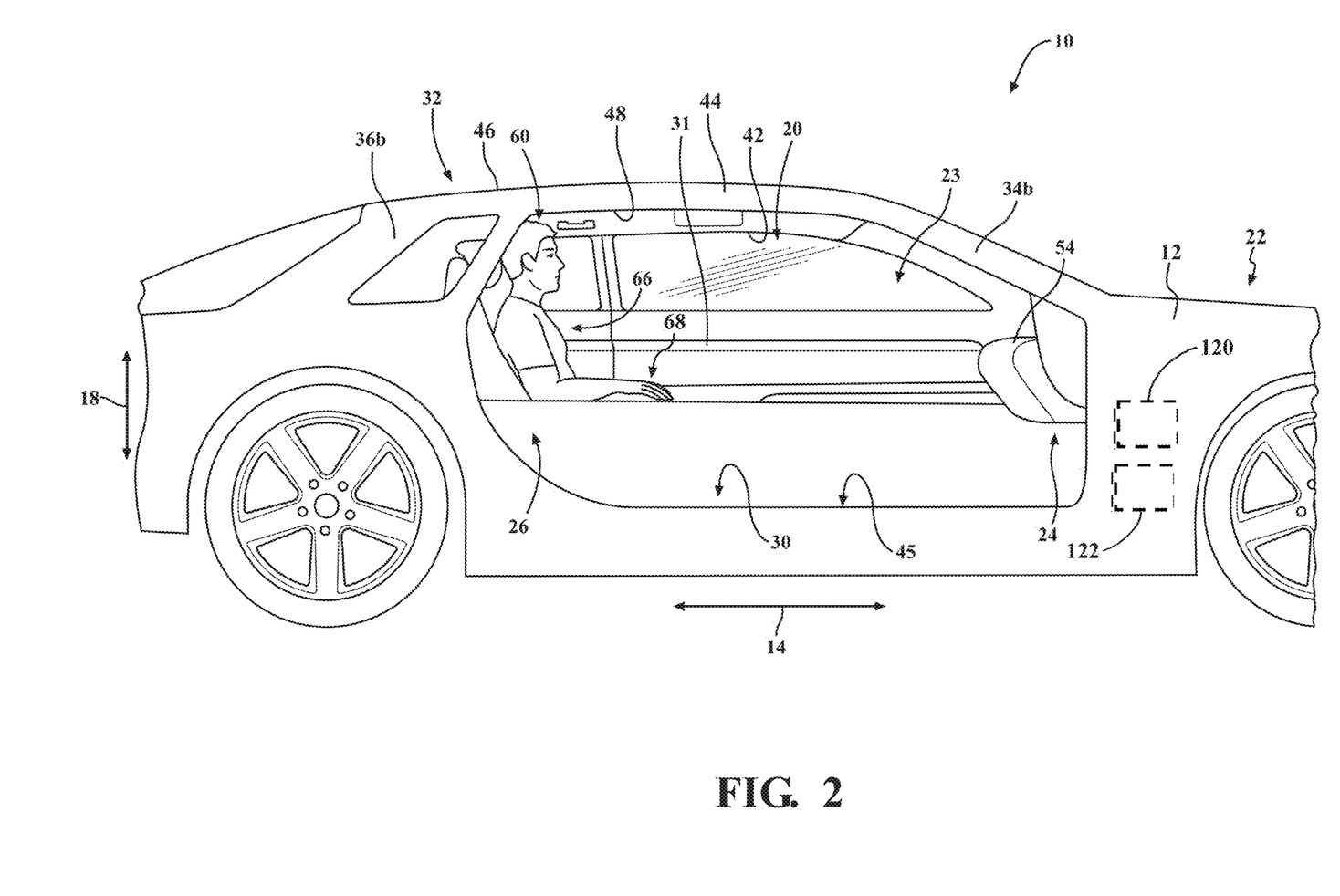
FIG. 2 is a partial side view of the vehicle of FIG. 1 with a passenger door removed.
Figure 3:
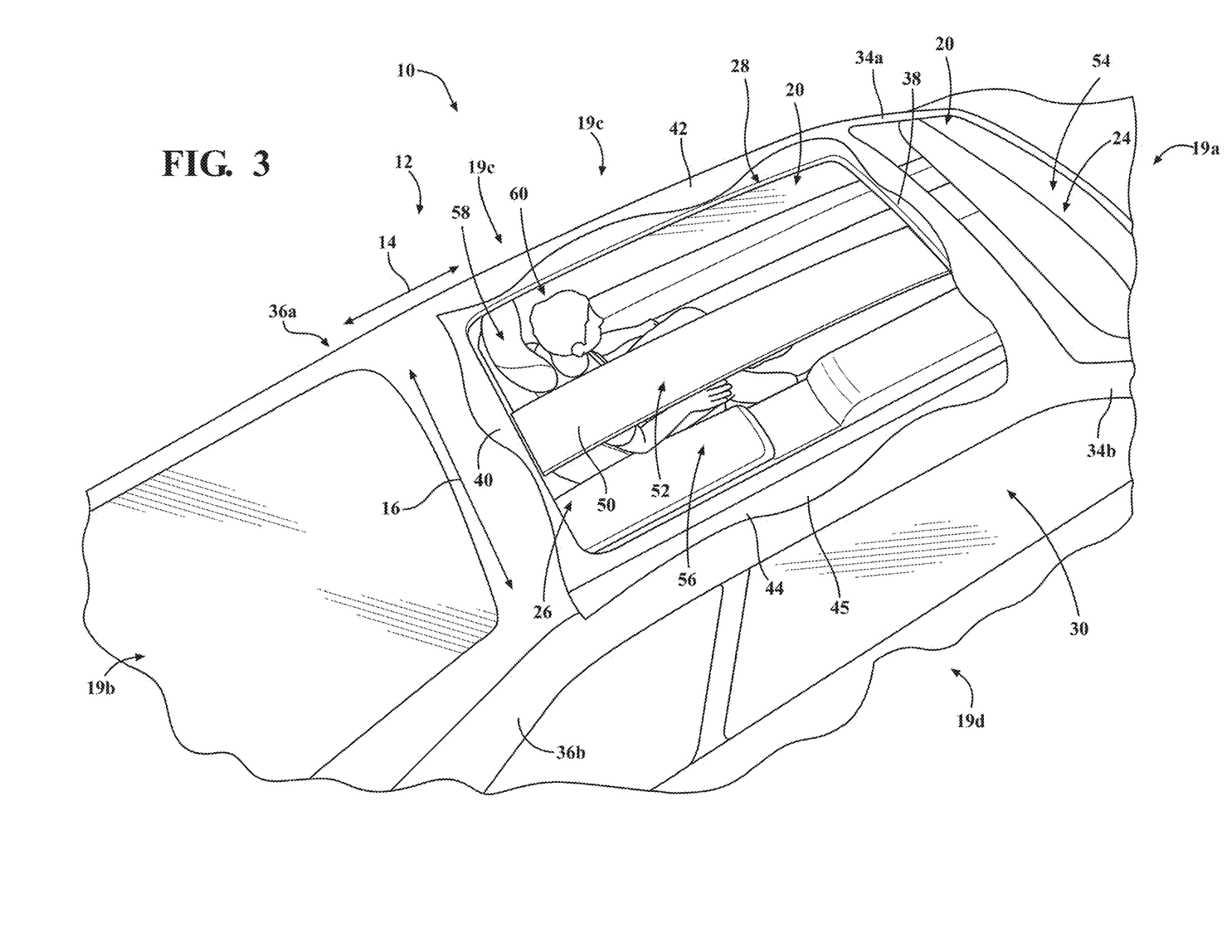
FIG. 3 is a partial top perspective view of the vehicle of FIG. 1 with a roof removed.
Figure 4:
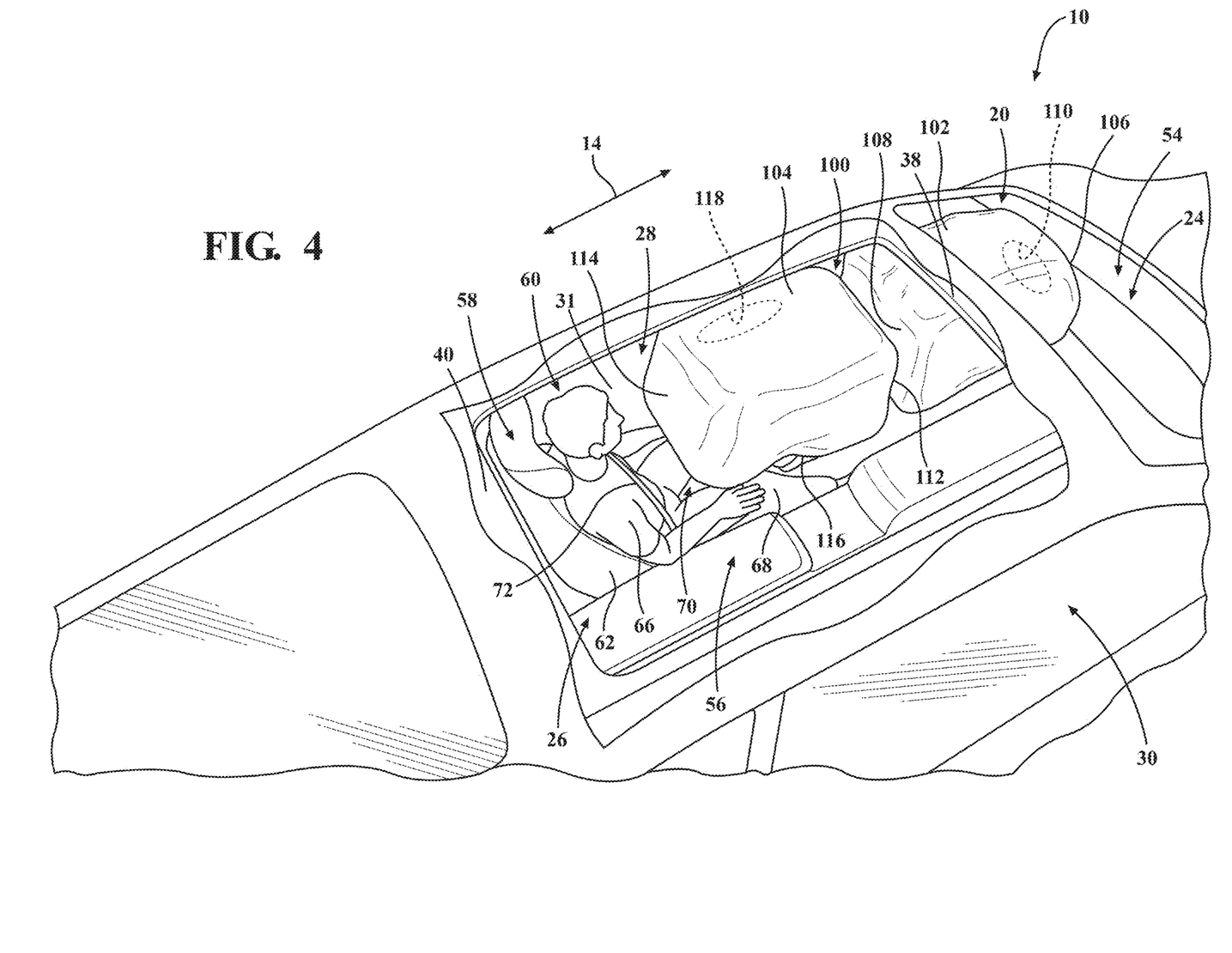
FIG. 4 is a partial top perspective view of the vehicle of FIG. 1 having a first configuration of a restraint system according to the principles of the present disclosure.
Figure 5:
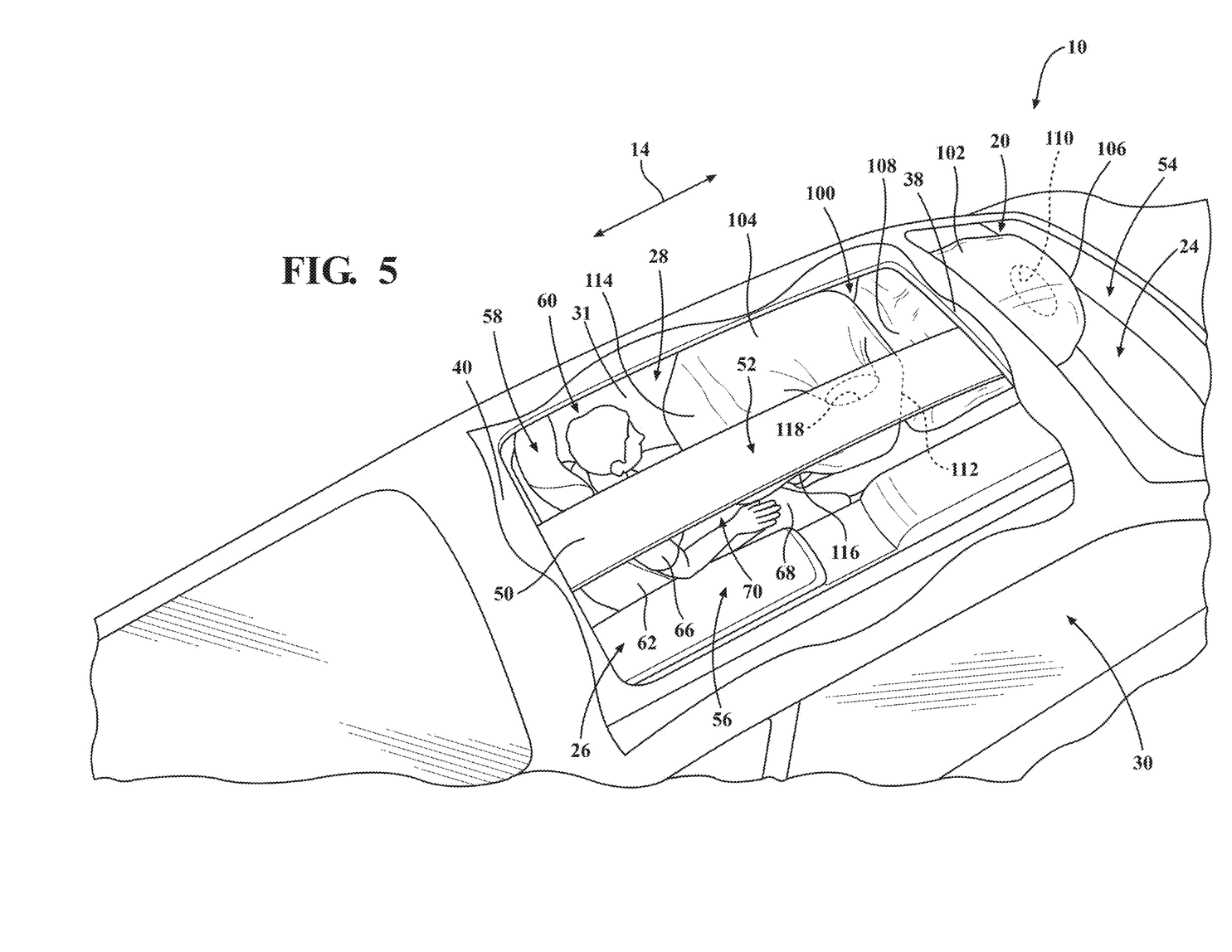
FIG. 5 is a partial top perspective view of the vehicle of FIG. 1 having a second configuration of a restraint system according to the principles of the present disclosure.
Figure 6:
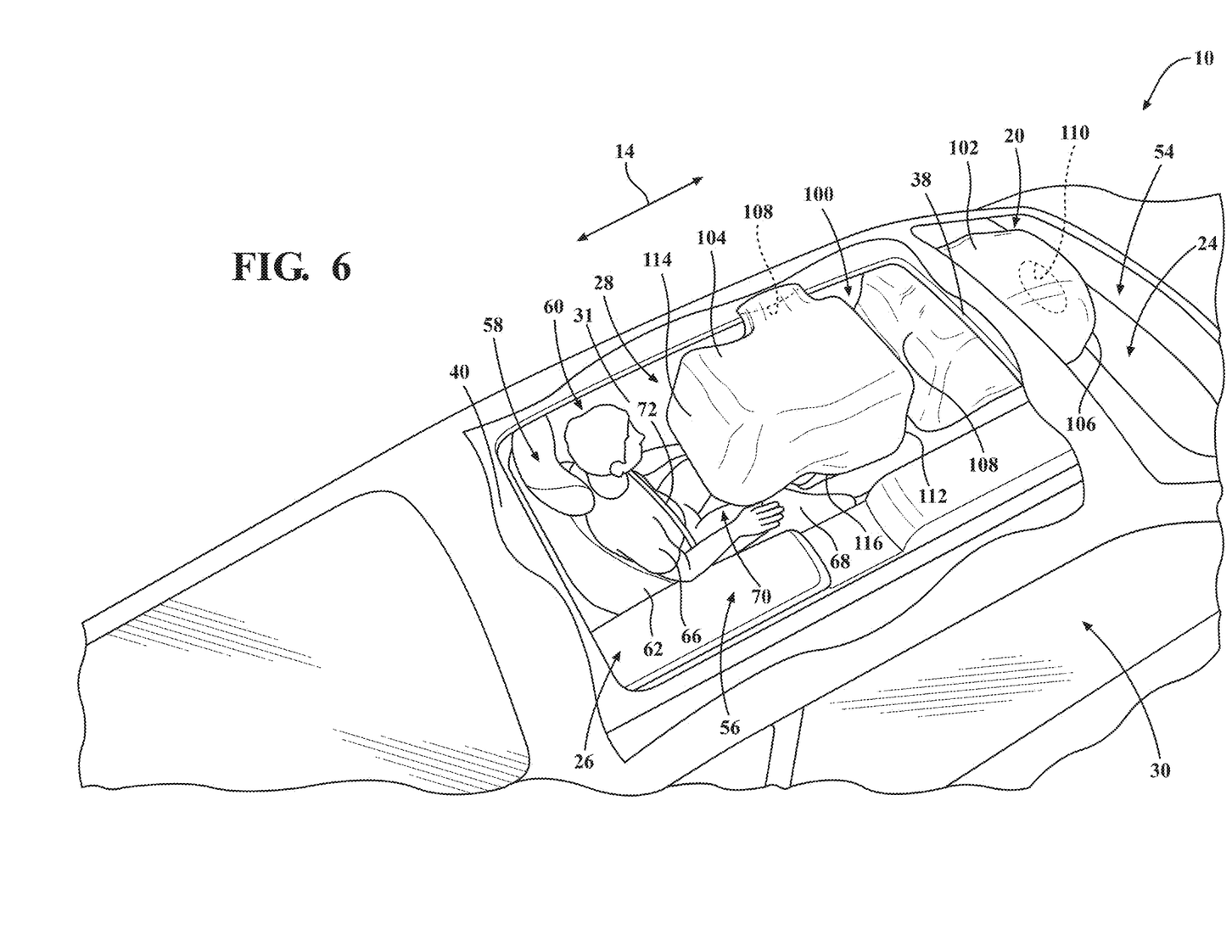
FIG. 6 is a partial top perspective view of the vehicle of FIG. 1 having a third configuration of a restraint system according to the principles of the present disclosure.
Figure 7:
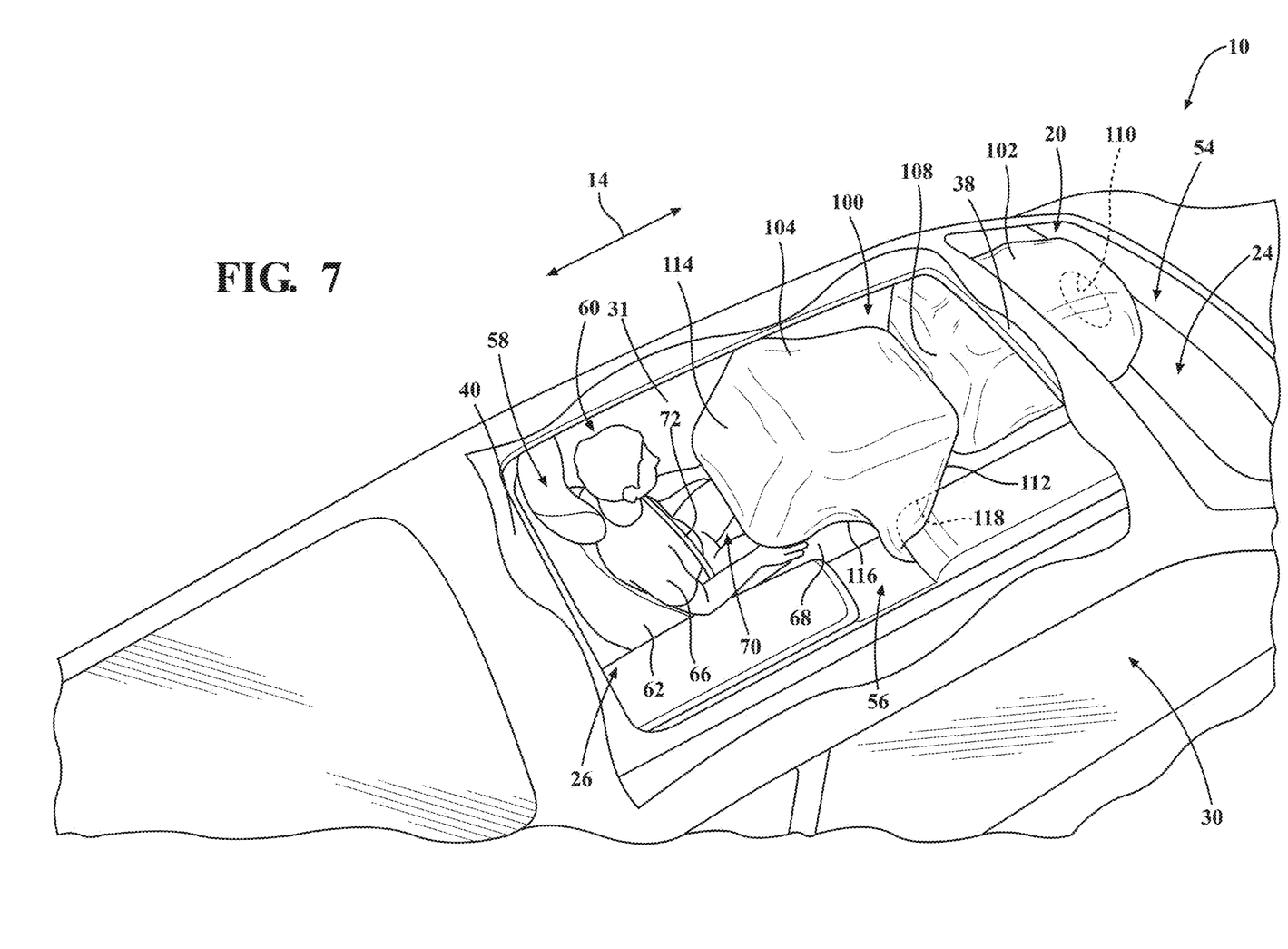
FIG. 7 is a partial top perspective view of the vehicle of FIG. 1 having a fourth configuration of a restraint system according to the principles of the present disclosure.
Figure 8:
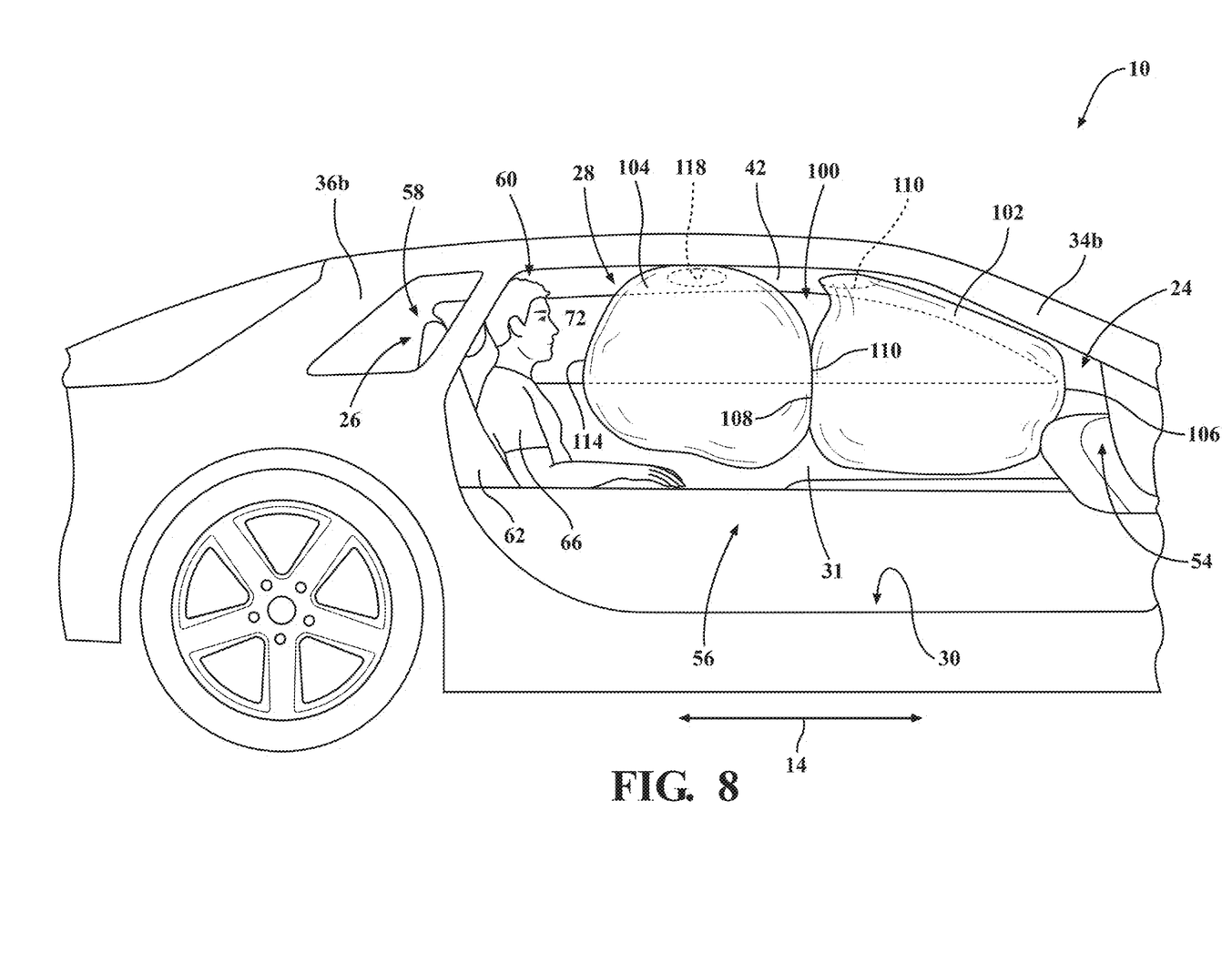
FIG. 8 is a partial side perspective view of the vehicle of FIG. 1 with a passenger door removed and a fifth configuration of a restraint system according to the principles of the present disclosure.

The vehicle body 12 includes an interior 20 and an exterior 22 opposite the interior 20. One or more closures or doors 23 can be coupled to the vehicle body 12 and further define aspects of the interior 20 and the exterior 22. With reference to FIG. 2, the interior 20 includes a first or front end 24 and a second or rear end 26 spaced from the front end 24 with respect to the longitudinal axis 14. The interior 20 also includes a first or left side 28 (FIG. 3) and a second or right side 30 spaced from the first side 28 with respect to the lateral axis 16, as shown in FIG. 3. The left and right sides 28, 30 can be at least partially defined by door panels 31 coupled to the doors 23, for example.

With reference to FIG. 3, the vehicle body 12 includes one or more structural pillars and rails that support a roof 32 (FIG. 2). For instance, the vehicle body 12 can include first or A-pillars 34a, 34b that are spaced from second or C-pillars 36a, 36b with respect to the longitudinal axis 14. A first or front roof rail 38 can be coupled to and extend cross-car between the first pillars 34a, 34b with respect to the lateral axis 16. Likewise, a second or rear roof rail 40 can be coupled to and extend cross-car between the second pillars 36a, 36b with respect to the lateral axis 16. A first or left-side roof rail (i.e., D-line) 42 can be coupled to and extend fore-aft between the first pillar 34a and the second pillar 36a on the left side 19c of the vehicle 10. A second or right-side roof rail (i.e., D-line) 44 can be coupled to and extend fore-aft between the first pillar 34b and the second pillar 36b on the right side 19d of the vehicle 10. In operation, the left-side roof rail 42 and/or the right-side roof rail 44 can include seals, hard trim, soft trim components that further define the interior 20 and/or exterior 22 of the vehicle 10. Similarly, the front roof rail 38 and/or the rear roof rail 40 can include seals, hard trim, soft trim components that further define the interior 20 and/or exterior 22 of the vehicle 10. Additionally, a windshield 43 (FIG. 1) can be coupled to and extend between the first A-pillars 34a, 34b.

The roof 32 is spaced from a floor 45 of the interior 20 with respect to the vertical axis 18 and can have an upper or exterior roof panel 46 and a lower or interior roof panel (e.g., a headliner) 48 spaced from the exterior roof panel 46, as shown in FIG. 2. A chamber (not shown) can be arranged between the upper roof panel 46 and the lower roof panel 48 and can define a pathway for heating, ventilation, and air conditioning (HVAC) ductwork, electrical wiring, lighting, etc. Additionally, the roof 32 can include a central spine 50 that extends between the front roof rail 38 and the second roof rail 40. A void or space 52 can be arranged between the interior roof panel 48 or the exterior roof panel 46 for HVAC ductwork, electrical wiring, lighting, etc.

The interior 20 can include a front or instrument panel 54 arranged at the front end 24 and extending between the left and right sides 28, 30. The front panel 54 can be configured to house vehicle electronics, such as a vehicle management system and one or more controllers, for example. The interior 20 can further include a console 56 that is coupled to the floor 45 and extends between the front and rear ends 24, 26. The console 56 can be configured to provide storage for passengers (e.g., cup holders, trays, etc.), house electronics, etc.

One or more seats 58 can be arranged throughout the interior 20 and may be coupled to the floor 45 or another portion of the vehicle body 12. Each of the one or more seats 58 can be configured to support an occupant 60 and can include an upper portion 62 and a lower portion 64. The upper portion 62 can be configured to support an upper half (e.g., head, neck, torso, etc.) 66 of the occupant 60 and the lower portion 64 can be configured to support a lower half (e.g., legs) 68 of the occupant 60. In other words, the occupants 60 may be situated in the seats 58 so that a portion of a lap area 70 (i.e., an anterior side of the lower half 68) is facing the interior roof panel 48. Each seat 58 can also include a seat belt 72 for securing the occupant 60 to the seat 58. The seat belt 72 can be coupled to a seat belt tensioner (not shown) that is configured to apply tension on the seat belt 72 during travel and/or as a result of a collision with the vehicle 10.

With reference to FIGS. 4-10, the vehicle 10 includes an occupant restraint system 100 that is arranged in the interior 20. The occupant restraint system 100 can be configured to deploy one or more airbags in response to a crash. For instance, the occupant restraint system 100 can include a first or primary airbag 102 and a second or secondary airbag 104. The first airbag 102 can be arranged in the interior 20 between the front panel 54 and the second airbag 104 with respect to the longitudinal axis 14. The second airbag 104 can be arranged in the interior 20 between the first airbag 102 and the one or more seats 58 with respect to the longitudinal axis 14. In the present illustrative example, the first airbag 102 and the second airbag 104 are arranged between the left side 28 of the interior 20 and the console 56 with respect to the lateral axis 16. More particularly, the first airbag 102 and the second airbag 104 can be arranged between the door panel 31 and the console 56 with respect to the lateral axis 16. Additionally or alternatively, the first airbag 102 and the second airbag 104 can be arranged between the left side 28 of the interior 20 and the central spine 50 with respect to the lateral axis 16.

Figure 9:
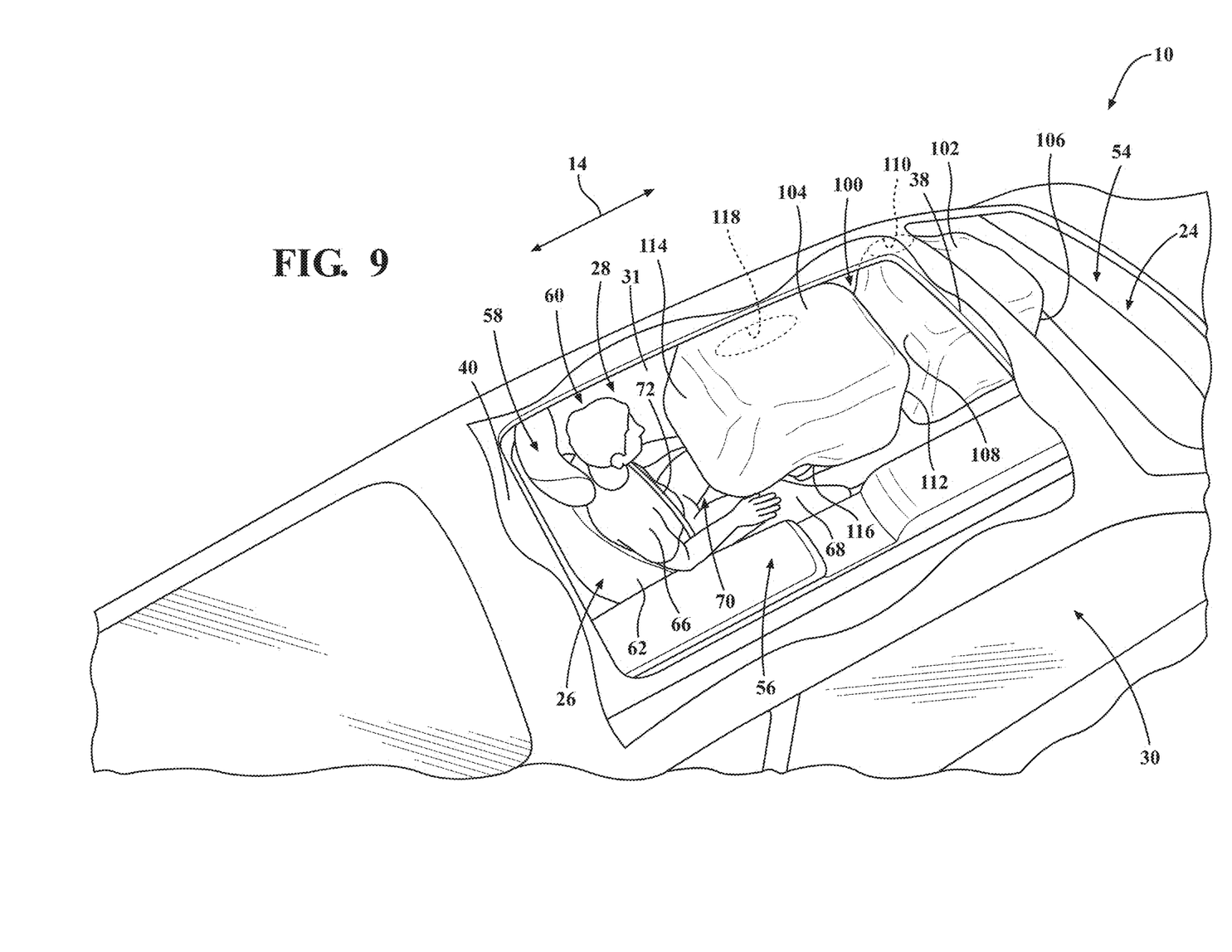
FIG. 9 is a partial top perspective view of the vehicle of FIG. 1 having a sixth configuration of a restraint system according to the principles of the present disclosure.
Figure 10:
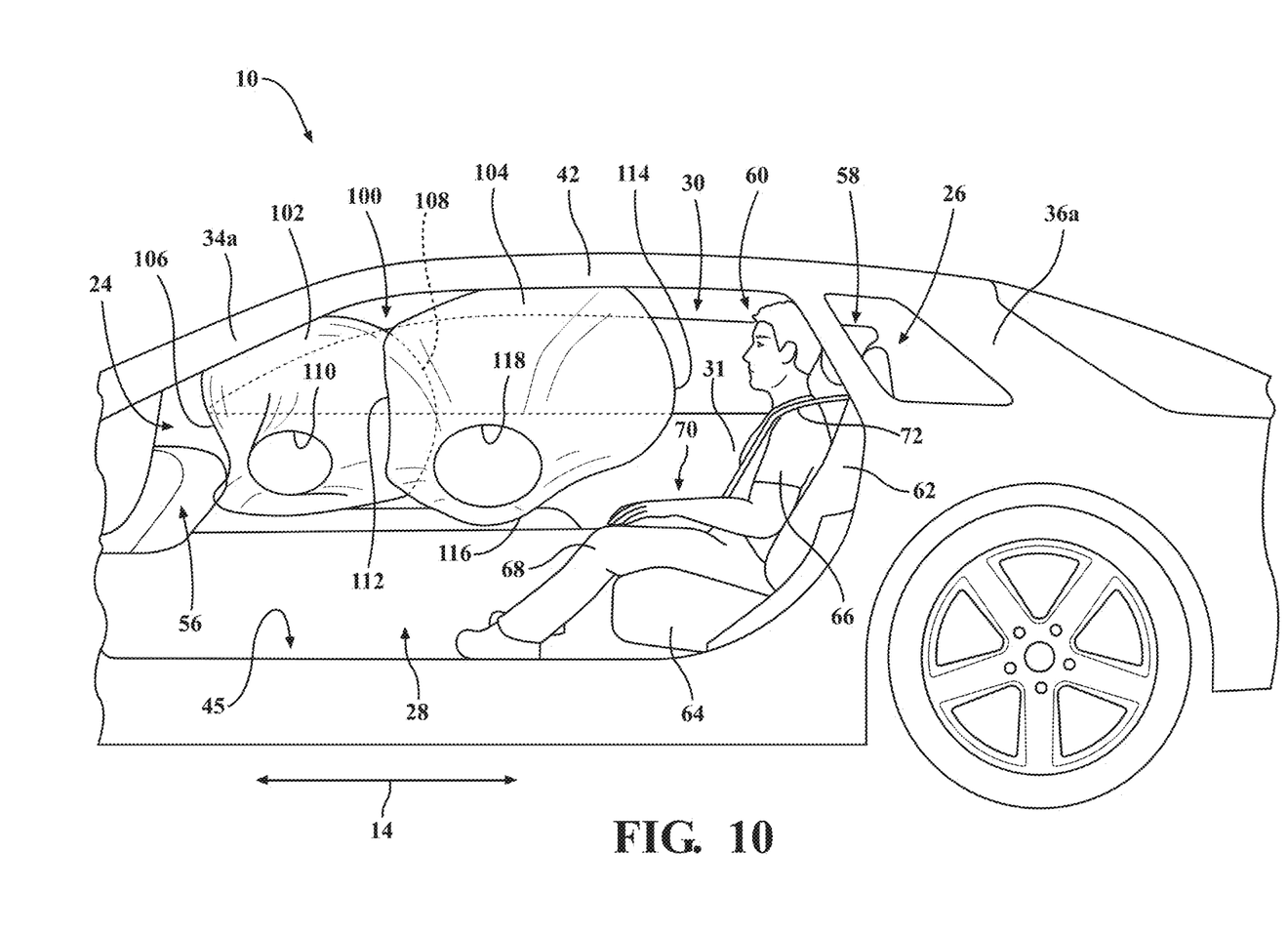
FIG. 10. is a partial side perspective view of the vehicle of FIG. 1 with a passenger door removed and a seventh configuration of a restraint system according to the principles of the present disclosure.

With continued reference to FIGS. 4-10, the first airbag 102 includes a first reactionary surface 106 that faces and is configured to engage with the front end 24 of the interior 20. More particularly, the first reactionary surface 106 can be configured to assume the shape of the front panel 54 and/or and interior portion of the windshield 43 (FIG. 1). According to one aspect, more than half of the first reactionary surface 106 can contact the front panel 54 and/or the windshield 43 when the first airbag 102 is deployed. Increasing the amount of contact between the first reactionary surface 106 and the front panel 54 and/or or windshield 43 can be desirable to enhance protection of the one or more occupants 60. The first airbag 102 includes a support surface 108 that faces the rear end 26 of the interior 20 and is spaced from the first reactionary surface 106 with respect to the longitudinal axis 14. The support surface 108 is configured to engage with and/or receive a portion the second airbag 104. According to one aspect, the first airbag 102 and, more particularly, the support surface 108 can have a depression, indent, or concave portion (not shown) that is configured to receive one or more portions of the second airbag 104. The first airbag 102 can also include a first inlet 110 arranged fore-aft between the first reactionary surface 106 and the support surface 108. Alternatively, the first inlet 110 can be coupled to and extend from a portion of the first reactionary surface 106 or the support surface 108. The occupant restraint system 100 can include a first inflator (not shown) that is communicatively coupled to the first inlet 110 and configured to inflate the first airbag 102 in response to a crash, for example. The first airbag 102 can be arranged in and deploy from several different locations within the interior 20 of the vehicle 10. For example, the first airbag 102 can be arranged in and deploy from the front panel 54 (FIGS. 4-7), the central spine 50 (FIG. 8), the left side roof rail 42 (FIG. 9), or the door panel 31 (FIG. 10).

With reference again to FIGS. 4-10, the second airbag 104 includes a second reactionary surface 112 that faces and is configured to engage with the support surface 108. More particularly, the second reactionary surface 112 can be configured to assume the shape of portion of the first airbag 102. Increasing the amount of contact between the second reactionary surface 112 and the support surface 108 of the first airbag 102 can be desirable to maintain a position of the second airbag 104 with respect to the one or more seats 58 and/or the one or more occupants 60. According to one aspect, the reactionary surface 112 can include an extension or convex portion (not shown) that can be received in the depression (not shown) of the support surface 108, for example. Such arrangement may be desirable for further securing the position of the second airbag 104 with respect to the first airbag 102. The second airbag 104 includes an occupant surface 114 that faces the rear end 26 of the interior 20 and is spaced from the second reactionary surface 112 with respect to the longitudinal axis 14. The occupant surface 114 is configured to engage with and/or restrain a portion of the occupant 60 from moving fore-aft and/or cross-car within the interior 20. For instance, the occupant surface 114 can support and/or receive the upper half 66 of the occupant 60 during a crash. The second airbag 104 can also include a bottom surface 116 that is coupled to and extends between the second reactionary surface 112 and the occupant surface 114. In at least one configuration, the bottom surface 116 faces the lower portion 64 of the seat 58. The bottom surface 116 can engage with and rely on the lower half 68 of the occupant 60 as a reactionary surface, for example. The second airbag 104 includes a second inlet 118 arranged fore-aft between the second reactionary surface 112 and the occupant surface 114. Alternatively, the second inlet 118 can be coupled to and extend from a portion of the second reactionary surface 112, the occupant surface 114, or the bottom surface 116. The occupant restraint system 100 can include a second inflator (not shown) that is communicatively coupled to the second inlet 118 and configured to inflate the second airbag 104 in response to a crash, for example. The second airbag 104 can be arranged in and deploy from several different locations within the interior 20 of the vehicle 10. For example, the second airbag 104 can be arranged in and deploy from the central spine 50 (FIG. 5), the left side roof rail 42 (FIGS. 6 and 8), the center console 56 (FIG. 7), or the door panel 31 (FIGS. 9 and 10).

With reference to FIG. 2, a control system 120 can be arranged in the vehicle 10 and can be communicatively coupled to the occupant restraint system 100. More particularly, the control system 120 can be communicatively coupled to one or more sensors 122 and the first and second inflators (not shown) so that when a crash is detected the first airbag 102 and/or the second airbag 104 can be inflated, for example. According to one aspect, the one or more sensors 122 can include accelerometers, gyroscopes, and/or impact sensors that are configured to continuously assess yaw rate, roll angle, impact, etc. The sensors 122 can also include one or more seat sensors (e.g., weight sensors) that are configured to provide data that can be used to determine whether the occupant 60 is arranged properly in the seat 58. According to another aspect, the controller 120 can be configured so that the first airbag 102 begins inflating before the second airbag 104. This may be desirable so that the second airbag 104 can rely on the support surface 108 to restrain the occupant 60, for example.

Figure 11:
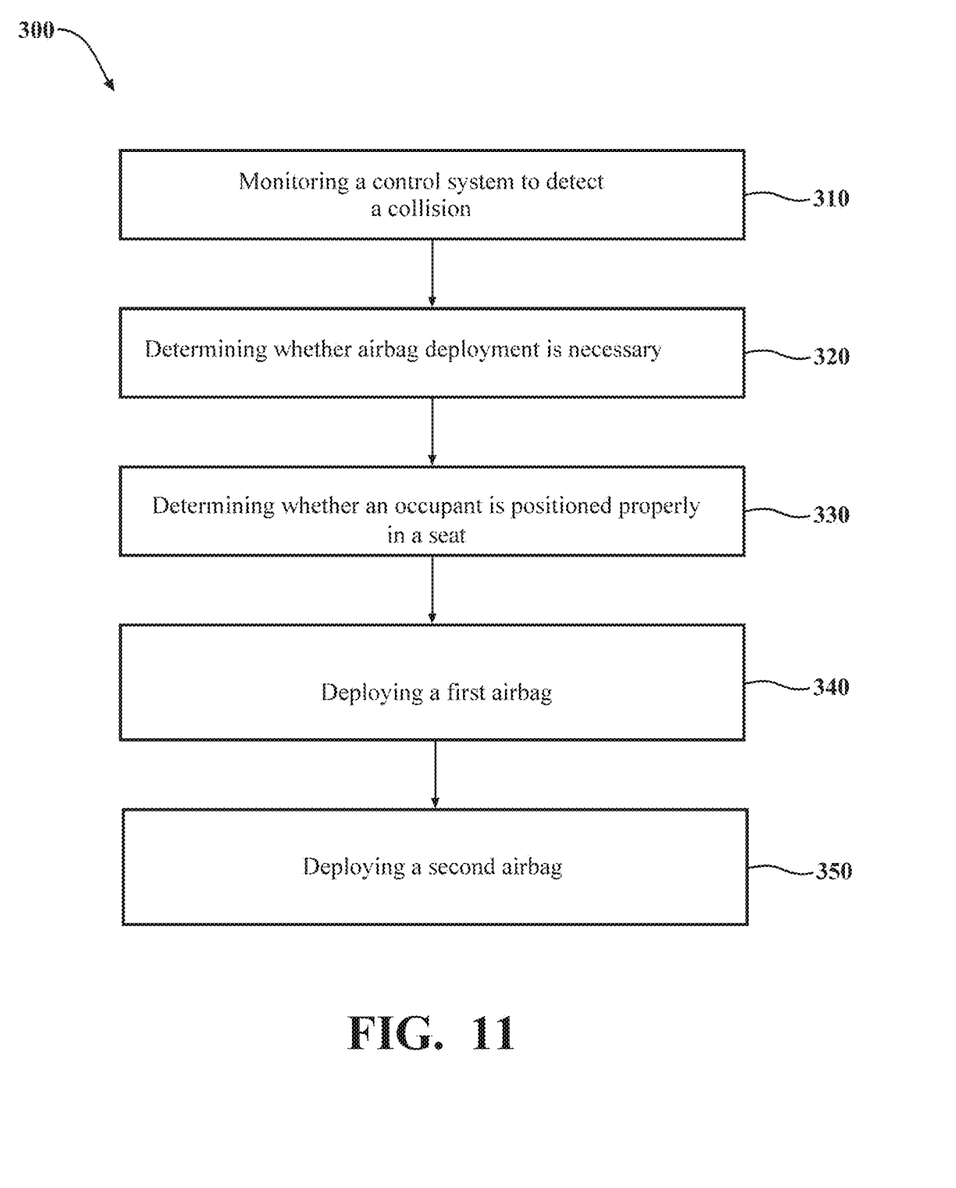
FIG. 11 is a flow diagram of a method of deploying an occupant restraint system according to principles of the present disclosure.

With reference to FIG. 11, a method 300 of deploying an occupant restraint system is provided.

At 310, the control system 120 can monitor and/or evaluate data received from the one more sensors 122 to determine whether a collision with the vehicle 10 has occurred.

At 320, the control system 120 can be configured to receive data from the one or more sensors and determine whether deployment of the first airbag 102 and/or the second airbag 104 is necessary. In other words, minor collisions may not necessitate deployment of the first airbag 102 and/or the second airbag 104.

At 330, the control system 120 can be configured to receive data from the one or more sensors 122 and determine whether the occupant 60 is properly positioned in the seat 58, for example. If the occupant 60 is not properly positioned in the seat 58 then the first airbag 102 and/or the second airbag 104 may not be deployed. This may be desirable to enhance protection of the occupant 60 during or shortly after a collision.

At 340, assuming airbag deployment is necessary and the occupant 60 is properly positioned in the seat 58, the first airbag 102 is deployed.

Subsequently or simultaneously, at 350, the second airbag 104 is deployed and contacts the first airbag 102.

The method 300 can also have a step that includes initiating a service request to emergency services as a result of a collision that necessitates deployment of the first airbag 102 and/or the second airbag 104.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:
 a vehicle body, comprising:
   an interior and an exterior opposite the interior, the interior comprising a front end and a rear end spaced from the front end with respect to a longitudinal axis, a first side and a second side spaced from the first side with respect to a lateral axis,
   at least one seat for an occupant arranged at the rear end of the interior,
   a front windshield arranged at the front end of the interior,
   a front panel arranged at the front end of the interior and spaced from the at least one seat with respect to the longitudinal axis,
   a pair of roof rails spaced cross-car from one another and extending between the front end and the rear end of the interior,
   a roof coupled to the pair of roof rails and including an exterior roof panel and an interior roof panel spaced from the exterior roof panel, and
   a central spine arranged cross-car between the roof rails and coupled the interior roof panel, the central spine at least partially defining a void between the central spine and the interior roof panel that extends continuously from the front windshield to the rear end of the interior; and
 an occupant restraint system arranged in the interior, comprising:
   a first airbag having a first inlet, a first reactionary surface facing the front end, and a support surface facing the rear end and spaced from the first reactionary surface, the first airbag being arranged in and configured to deploy from the front panel, and
   a second airbag having a second inlet, a second reactionary surface engaged with the support surface, and an occupant surface facing the rear end, the second airbag being arranged in and configured to deploy from the void between the central spine and the interior roof panel.

2. The vehicle of claim 1, wherein the first airbag is arranged between the front end and the second airbag with respect to the longitudinal axis.

3. The vehicle of claim 2, wherein the second airbag is arranged between the first airbag and the rear end with respect to the longitudinal axis.

4. The vehicle of claim 3, wherein the first airbag and the second airbag are both arranged fore-aft with respect to the at least one seat.

5. The vehicle of claim 1, wherein the vehicle body further includes:
  one or more doors that each include a door panel, and
  a console arranged in the interior and extending between the front end and the rear end with respect to the longitudinal axis.

6. The vehicle of claim 1, wherein the occupant surface faces the at least one seat.

7. The vehicle of claim 6, wherein the second airbag includes a bottom surface that extends between the second reactionary surface and the occupant surface.

8. The vehicle of claim 1, wherein the first airbag and the second airbag each extend more than half of a length between the front end and the rear end of the interior.

9. The vehicle of claim 1, wherein the second airbag further comprises a bottom surface that is configured to engage with a lower portion of the at least one seat or an occupant seated therein.

10. The vehicle of claim 1, wherein the occupant restraint system is operatively coupled to a control system configured to monitor one or more sensors and to deploy the first airbag before the second airbag in response to a detected collision.

11. An occupant restraint system of a vehicle having an interior with a front end and a rear end spaced from the front end with respect to a longitudinal axis and a first side and a second side spaced from the first side with respect to a lateral axis that is perpendicular to the longitudinal axis, the interior at least partial defined by an interior roof panel extending between the front end, the rear end, the first side, and the second side, the occupant restraint system comprising:
  a central spine spaced between the first side and the second side of the interior and coupled to the interior roof panel, the central spine defining a void that is disposed between an interior side of the central spine and the interior roof panel;
  a first airbag having a first inlet, a first reactionary surface facing the front end, and a support surface facing the rear end and spaced from the first reactionary surface; and
  a second airbag having a second inlet, a second reactionary surface engaged with the support surface, and an occupant surface facing the rear end, the second airbag being arranged in and configured to deploy from the void.

12. The occupant restraint system of claim 11, wherein the first airbag is arranged between the front end and the second airbag with respect to the longitudinal axis.

13. The occupant restraint system of claim 12, wherein the second airbag is arranged between the first airbag and the rear end with respect to the longitudinal axis.

14. The occupant restraint system of claim 11, wherein the second airbag further includes a bottom surface that extends between the second reactionary surface and the occupant surface.

15. The occupant restraint system of claim 11, wherein the first airbag and the second airbag extend more than half of a length between the front end and the rear end of the interior.

16. The occupant restraint system of claim 11, wherein the first inlet is arranged between the first reactionary surface and the support surface with respect to the longitudinal axis.

17. The occupant restraint system of claim 16, wherein the second inlet is arranged between the second reactionary surface and the occupant surface with respect to the longitudinal axis.

* * * * *